(12) United States Patent
Steadman Booker et al.

(10) Patent No.: US 10,267,929 B2
(45) Date of Patent: Apr. 23, 2019

(54) METHOD OF PIXEL VOLUME CONFINEMENT

(71) Applicant: KONINKLIJKE PHILIPS N.V., Eindhoven (NL)

(72) Inventors: Roger Steadman Booker, Aachen (DE); Frank Verbakel, Helmond (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/770,796

(22) PCT Filed: Nov. 16, 2016

(86) PCT No.: PCT/EP2016/077848
§ 371 (c)(1),
(2) Date: Apr. 25, 2018

(87) PCT Pub. No.: WO2017/085118
PCT Pub. Date: May 26, 2017

(65) Prior Publication Data
US 2018/0313964 A1 Nov. 1, 2018

(30) Foreign Application Priority Data
Nov. 19, 2015 (EP) ..................................... 15195378

(51) Int. Cl.
*G01T 1/202* (2006.01)
*G01T 1/29* (2006.01)

(52) U.S. Cl.
CPC ............ *G01T 1/2928* (2013.01); *G01T 1/202* (2013.01)

(58) Field of Classification Search
CPC ......... G01T 1/24; G01T 1/247; G01T 1/2018; G01T 1/2002; G01T 1/2006
See application file for complete search history.

(56) References Cited

U.S. PATENT DOCUMENTS

| | | |
|---|---|---|
| 2006/0289777 A1 | 12/2006 | Li |
| 2012/0193739 A1 | 8/2012 | Hackenschmied |
| 2013/0161773 A1 | 6/2013 | Dierre |
| 2014/0048714 A1 | 2/2014 | Shahar |

FOREIGN PATENT DOCUMENTS

| | | |
|---|---|---|
| DE | 102011083532 | 2/2013 |
| DE | 102013202630 | 8/2017 |
| EP | 2180530 | 4/2010 |
| EP | 2337082 | 6/2011 |
| WO | 2010073189 | 7/2010 |
| WO | 2014015982 | 1/2014 |
| WO | 2014030094 | 2/2014 |

OTHER PUBLICATIONS

MoberlyChan, et al., "Fundamentals of Focused Ion Beam Nanostructural Processing: Below, at, and Above the Surface", 2007; MRS Bulletin 32(5): 424-432.

*Primary Examiner* — David P Porta
*Assistant Examiner* — Fani Boosalis

(57) ABSTRACT

Method of pixel volume confinement in a crystal of an energy resolving radiation detector, preferably an X-ray detector, more preferably a Computed Tomography detector, the crystal having a cathode side and an anode side, comprising: a. Inducing a break line (501) in the crystal along a pixel virtual limits b. Passivating the break line.

11 Claims, 4 Drawing Sheets

METHOD OF PIXEL VOLUME CONFINEMENT

CROSS REFERENCE TO RELATED APPLICATIONS

This application is the U.S. National Phase application under 35 U.S.C. § 371 of International Application No. PCT/EP2016/077848, filed Nov. 16, 2016, published as WO 2017/085118 on May 26, 2017, which claims the benefit of European Patent Application No. 15195378.3 filed Nov. 19, 2015. These applications are hereby incorporated by reference herein.

The invention relates to a method of pixel volume confinement in a crystal of an energy resolving detector. Although the invention should find its main application in Computed Tomography and Spectral Computed Tomography, it can actually be applied in any energy-resolving photon counting detector based on direct conversion.

BACKGROUND

Energy resolving detectors for Computed Tomography rely on direct conversion materials. The pixel size of such detectors is determined by the trade-off between the count rate capability per unit area measured in Mcps (Million counts per second) per $mm^2$ and the spectral information that can be resolved. That is, a smaller pixel will result in higher achievable count rate density at the cost of a reduced energy resolution. The energy resolution degradation is largely caused by charge sharing across pixels: part of the charge corresponding to an interaction in a given pixel volume drifts to the neighboring pixel, which results in an error in the energy estimation of the primary photon and uncertainty about the location of the interaction.

Charge sharing occurs when charges pertaining to a pixel drift in the electric field lines corresponding to a neighbor pixel. Since the charge cloud has a finite non-zero volume, it expands as it drifts towards the anode, due to e.g. diffusion. As there are no physical boundaries across pixels, this effect cannot be avoided unless some pixel confinement mechanisms are in place.

Charge sharing correction methods do exist in the electronics responsible to acquire the generated charge as a response to an impinging x-ray photon, e.g. R. Ballabriga et al, "The Medipix3 Prototype, a Pixel Readout Chip Working in Single Photon Counting Mode With Improved Spectrometric Performance" Nuclear Science, IEEE Transactions on Volume:54, Issue: 5. Such methods however pose a significant penalty in terms of count rate capabilities, as for each impinging photon, any neighbor event needs to be evaluated and arbitrated in order to locate the full charge in the pixel of origin.

Machining of direct converters has been proposed in the past. This however entails very intrusive methods such as sawing, milling and/or etching to be performed in a very brittle crystal, e.g. CdTe, CdZnTe, with severe consequences in terms of formation of large defects or even complete rupture. Creating a waveguide structure on substrate by utilizing FIB milling/etching is known from MoberlyChan et al. (MRS BULLETIN ● VOLUME 32 ● MAY 2007).

Alternative technologies have been developed to try to solve this problem. For instance, US20110211668 teaches to confine pixels by manipulating crystal growth. It is also known from US20140048714 to confine charge sharing between pixels by inducing Electric field rather than breaking, etching or milling fine recesses on the crystal.

The purpose to the invention is to provide a way to physically confine the pixels of an existing crystal in order to avoid charge-sharing issues.

SUMMARY OF THE INVENTION

In order to address the above problems, the invention seeks to minimize charge sharing across pixels by creating a pixel boundary. More precisely, the invention relates to a method of pixel volume confinement in a crystal of an energy resolving radiation detector, preferably an X-ray detector, more preferably a Computed Tomography detector, the crystal having a cathode side and an anode side, comprising inducing a break line in the crystal along a pixel virtual limits passivating the break line wherein the break line is induced by at least one of a focused ion beam and ion implantation.

The pixel virtual limits corresponds to a region of the crystal which orthogonal projection on the cathode matches the actual pixel limits. 'Along' a pixel virtual limits is to be understood as 'in the same direction than' a pixel virtual limits, that is to say the break line is to be approximatively centered on the pixel virtual limits. In particular, the wording makes no assumption on the break line thickness.

Due to the break of the crystal structure, electrons caused by an interaction within a pixel cannot drift to the neighboring pixel across the crystal break line. However, crystal defects generally cause locations for charge trapping. Left untreated, the induced break line would also be a charge trapping location, negatively influencing the electric field and charge collection efficiency.

That is why the crystal break line of the invention is then passivated, in order to prevent it to constitute a charge trapping site.

The break line can be induced by a focused ion beam (FIB).

Submicron gaps are possible using FIB, thereby enabling a very fine resolution and making the loss in pixel volume negligible.

Alternatively, the break line can be induced by introducing an oxide into the crystal. Instead of physically remove material as the FIB can do, an ion implementation of an oxide is thus performed, resulting in the formation of an oxidized region preventing the charge cloud to be collected by neighboring pixels.

The break line can be passivated through oxidation of the crystal, the oxidized part of the crystal having a thickness preferably smaller than 10 nm.

The oxidation of the crystal can be performed either wet-chemically or by an oxide plasma. Before the oxidation of the crystal, the passivation can further comprise etching the break line surface, which can allow to remove defects from the break line surface. The gaps can afterwards be filled with an insulating material.

The break line should not be too wide in order not to decrease the pixel size too much. Preferably, the break line has a width lower than 1 μm.

The break line usually has an end on the anode side of the crystal where the charge cloud will tend to be widest and where a confinement of the diffusion may have the largest contribution.

However, as the break line inducing methods can be limited in depth to a few tens of μm, likely up to 100 μm deep, it can be of interest to also induce a charge-confining structure according to the invention on the cathode side, thus further contributing to the confinement of the electric field lines within the pixel. As such, the break line can have an end on the cathode side of the crystal.

In order to further strengthen the electric field line near the anode structure the method according to the invention can further comprise locally doping the anode side of the crystal with a doping material.

The doping can typically be performed by:
- deposing the doping material on a receiving area of the anode side of the crystal,
- heating the receiving area, preferably by at least one laser beam, in order to faciliate the doping material diffusion through the crystal, and
- removing the non-diffused doping material, preferably through etching.

The doping material can advantageously be Indium. As a matter of fact, Indium is known to easily diffuse into CZT, which is a typical material for the crystal.

The receiving area can cover the whole anode side of the crystal or only a part of it. The receiving area can be located between the pixels or in the pixel area. Locating the receiving area between the pixels could prevent the formation of a space-charge region in the area between pixels exempt of electric field lines. Such space charge regions can influence the weighting potential and therefore the charge collection properties of the anodes. The introduction of a doped region between pixels can facilitate removing any trapped charges in that area. This could however have the shortcoming of an increase crosstalk path among pixels due to a low resistance path, but the existence of the break lines does prevent such shortcoming.

The invention also relates to a Radiation detector, preferably an X-ray detector, more preferably a Computed Tomography detector, comprising a crystal with passivated break lines along a pixel virtual limits. The invention also relates to a device able to implement a method according to the invention. Specifically, the invention also relates to a X-ray scanner, preferably a Computed Tomography scanner, comprising a crystal of an energy resolving detector with passivated break lines along pixel virtual limits.

BRIEF DESCRIPTION OF THE FIGURES

The invention shall be better understood by reading the following detailed description of an embodiment of the invention and by examining the annexed drawing, on which.

DETAILED DESCRIPTION OF EMBODIMENTS

Figure 1:
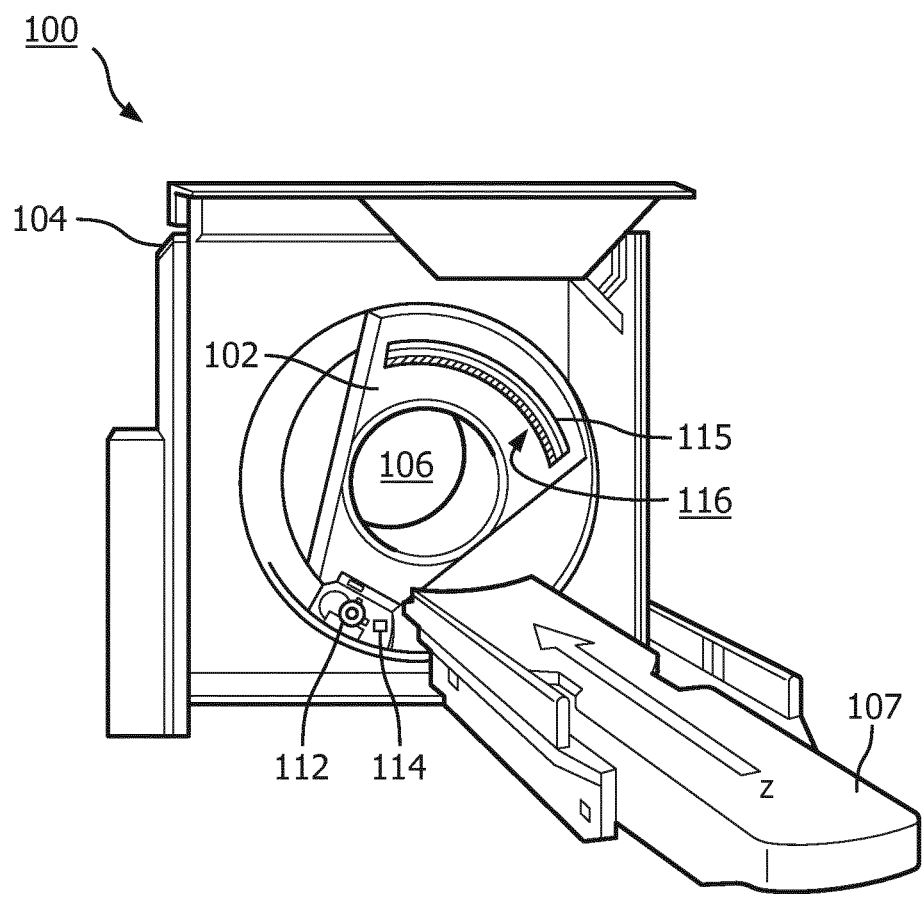
FIG. 1 represents a Computed Tomography device.

FIG. 1 schematically illustrates an example imaging system 100, such as a computed tomography (CT) scanner. The imaging system 100 includes a rotating gantry 102 and a stationary gantry 104. The rotating gantry 102 is rotatably supported by the stationary gantry 104. The rotating gantry 102 is configured to rotate around an examination region 106 about a longitudinal or z-axis. The imaging system 100 further includes a subject support 107 that supports a subject or object in the examination region 106 before, during and/or after scanning. The subject support 107 can also be used to load and/or unload the subject or object into or from the examination region 106. The imaging system 100 further includes a radiation source 112, such as an x-ray tube, that is rotatably supported by the rotating gantry 102. The radiation source 112 rotates with the rotating gantry 102 around the examination region 106 and is configured to generate and emit radiation that traverses the examination region 106. The imaging system 100 further includes a radiation source controller 114. The radiation source controller 114 is configured to modulate a flux of the generated radiation. For example, the radiation controller 114 can selectively change a cathode heating current of the radiation source 112, apply a charge to inhibit electron flow of the radiation source 112, filter the emitted radiation, etc. to modulate the flux.

The imaging system 100 further includes a one or two dimensional array 115 of radiation sensitive detector pixels 116. The array 115 is located opposite the radiation source 112, across the examination region 106, detect radiation traversing the examination region 106, and generate an electrical signal (projection data) indicative thereof.

The array typically consists of an arrangement of direct conversion crystals typically 1 to 3 mm thick having a cathode side 250, which is to be impinged by the X-ray photons, and an anode side 260 which is compartmented into an array of anodes which constitute the actual pixels 116 on which a signal is generated. In a typical array, in which the invention is not implemented, the anodes consists in additional metallic plates on the anode side 260 of the crystal. The plates are not in direct contact together and each plate generates its own signal in response to an X-ray photon interaction. This signal, typically in the form of a current transient response is subsequently connected to a readout electronics circuit or Application Specific Integrated Circuit (ASIC), not illustrated in the figure. The signal is processed by the readout circuit to provide an electrical current or voltage having a peak amplitude or a peak height that is indicative of the energy of a detected photon. The height of the processed signal can therefore be compared to pre-defined energy thresholds and corresponding counters are incremented every time a photon is processed resulting on a peak height higher than one or several predefined thresholds. The crystal may be of any suitable direct conversion material such as CdTe, CdZnTe, Si, Ge, GaAs, PbO or other direct conversion material. In case of the embodiment further developed below, the crystal is supposed to include CdZnTe (CZT).

Figure 2A:
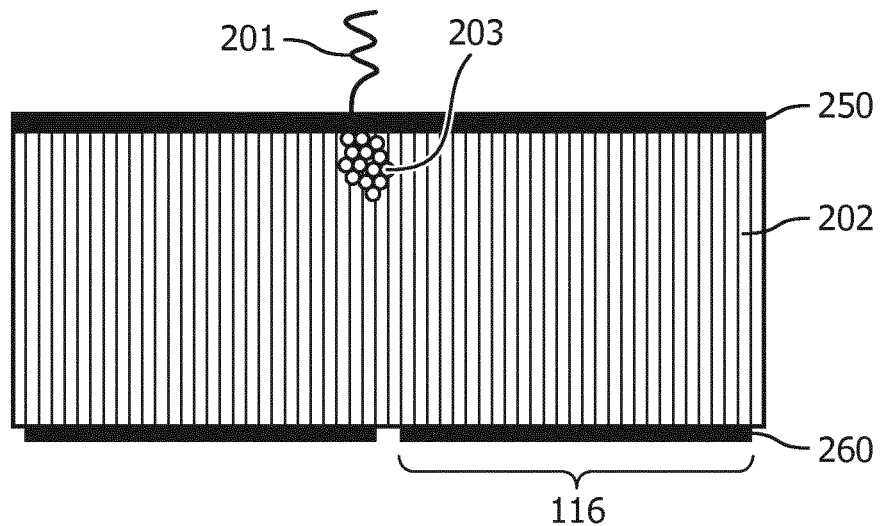
FIG. 2 represents a charge sharing issue on a crystal on which the invention has not been implemented, FIG. 3 schematically represents how the invention allows to solve the charge sharing issue represented on FIG. 2.
Figure 2B:
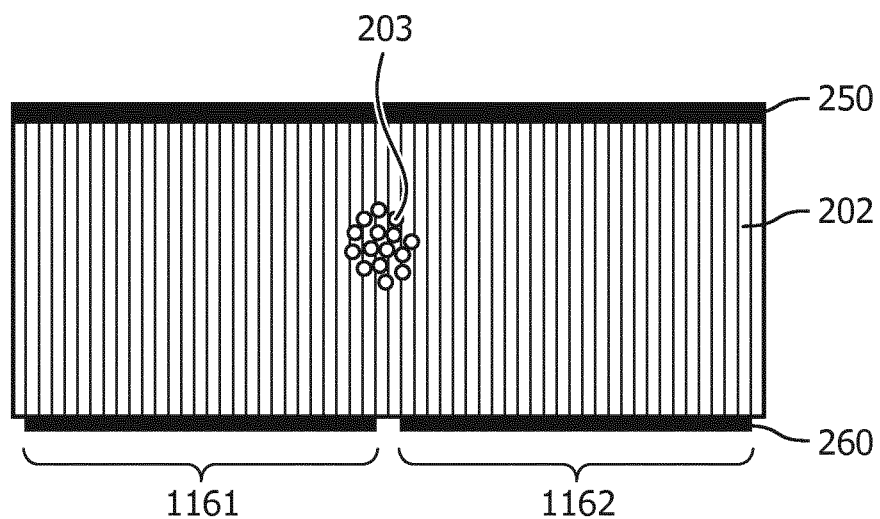
Figure 2C:
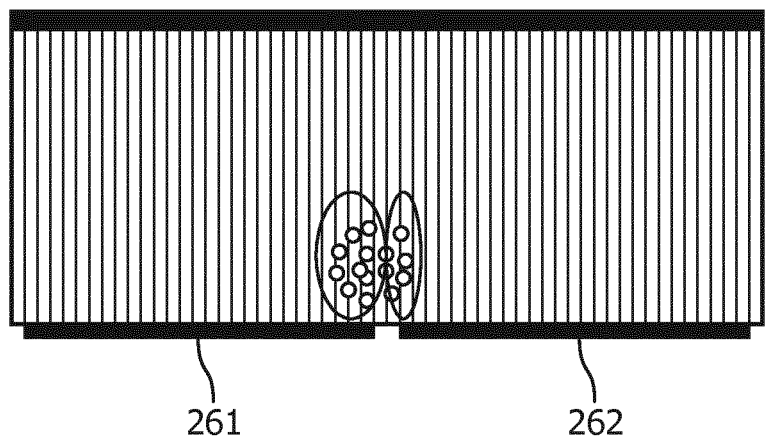

As depicted on FIG. 2, when an X-ray photon 201 impacts the cathode side 250 of the direct conversion crystal, an electron-hole cloud is generated in the crystal. An energy of 100 keV corresponds to approximately 22,000 electrons. The contribution of the holes to the signal is usually negligible as they are too slow in materials like CZT, as such, holes are not represented on the figures. The electrons 203 drift towards the anode side 260 following the electric field lines 202 which, for clarity sake has been represented straight and parallel in the whole crystal although they might have different forms, especially on the anode side 260. The cathode side 250 is usually biased to about −300 V/mm or more, with respect to the anode side 260. As the cloud 203 drifts, it also expands due to diffusion and other mechanisms like e.g. Coulomb repulsion, as shown on FIG. 2B.

As explained, in a crystal in which the invention is not implemented, the pixels 116 are defined externally to the crystal by the metallic plates which constitute the anodes. Two anodes 261 and 262 and their corresponding pixels 1161 and 1162 have been represented on FIG. 2. The fact that the anodes are generated externally to the crystal raises an issue if a cloud is generated near the boundaries of two pixels. As a matter of fact, part of the electrons 203 will diffuse towards electric field lines corresponding to the neighbor pixel and induce a signal which does not reflect the way the original X-ray photon impacted the crystal, see FIG. 2C. Specifically, both anodes 261 and 262 will emit a signal and two events will be registered despite having been originated by one single interaction.

Figure 3:
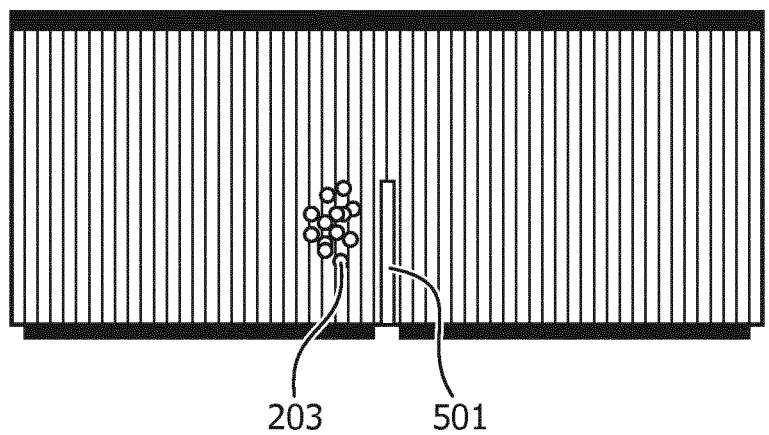

In case of the present invention, the electrons 203 are confined to either or both sides of the pixel boundaries which restrict the cloud and make it less likely that part of the charges are registered on neighbor pixels, as it has been schematically illustrated on FIG. 3.

The confinement is performed inside the crystal through passivated break lines 501. The induced break lines must be very thin in order to impact as few as possible the pixel resolutions. Indeed, the spacing between two pixels is necessarily more important than the width of the break line. In order to generate very thin break lines, these are induced thanks to a Focused Ion Beam (FIB). A FIB uses ions to physically remove atoms from a crystal. FIB is used for preparation of samples for TEM inspection, where also the damage of the crystal that is inspected should be prevented. The ion bombardment of the FIB can be controlled in such a manner that the damage in the surrounding layers is minimized. This will strongly reduce the performance degradation due to crystal defects compared to the other methods.

Measures must be however taken to minimize trapping of some of the drifting electrons 203, hence negatively influencing the signal. In order to avoid such charge trapping effect, the break lines are then passivated.

The passivation is preferably performed through oxidation. The oxidation itself can be done by any convenient means, using for instance an oxide plasma, or in a more classical way, wet chemically. The oxidation is performed on a very thin layer of the crystal, typically several nanometers. The passivation is similar to often used sidewall passivation. Before this oxidation a short etching step can be introduced to remove defects from the break line surface. If needed the gaps can afterwards be filled with an insulating material.

Another method to create a separation between the pixels is to introduce an oxide into the direct conversion material. Instead of physically remove material as proposed above, an ion implementation of e.g. oxide forms an oxidized region where the oxygen ions are implanted, with the effect of preventing the charge cloud to be collected by neighboring pixels.

Figure 4A:
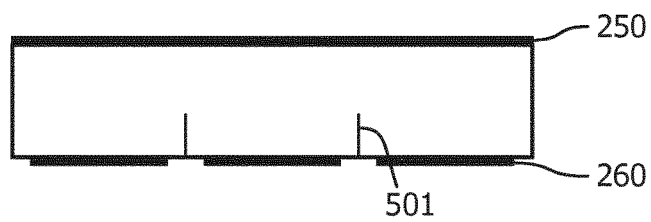
FIG. 4 is a schematic cross-sectional view of a detector comprising passivated break lines according to the invention.
Figure 4B:
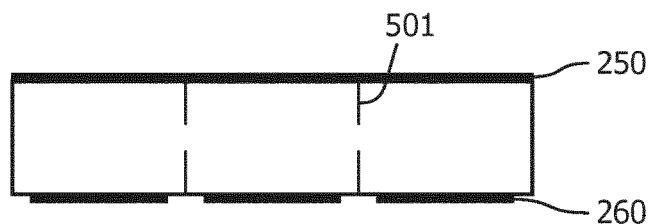

FIG. 4a and FIG. 4b show as cross sections of the direct converter bulk. The FIB structure is to be understood as a trench-like structure along all side of the pixel boundaries.

The break lines are preferably generated on the anode side 260 as the electron cloud 203 will have expended more when getting closer to the anode side, as illustrated on FIG. 4a. However, it is clear that the more confinement, the less charge sharing. As such, it is of interest to have either very deep break lines originating from the anode side 260 or two series of break lines facing each other, one originating from the anode side 260, and the other originating from the cathode side 250, as illustrated on FIG. 4b.

Such configuration might raise some frailty issues for the crystal and the amount of confinement must be carefully weighed against the life duration requirements of the crystal.

It might be interesting to generate break lines inside the crystal, which would not have any end on either the anode or the cathode side. However, the techniques to generate such break lines without impacting too much the crystal structure are not as accurate and it might be preferable to stick to the former detailed configuration.

Figure 5:
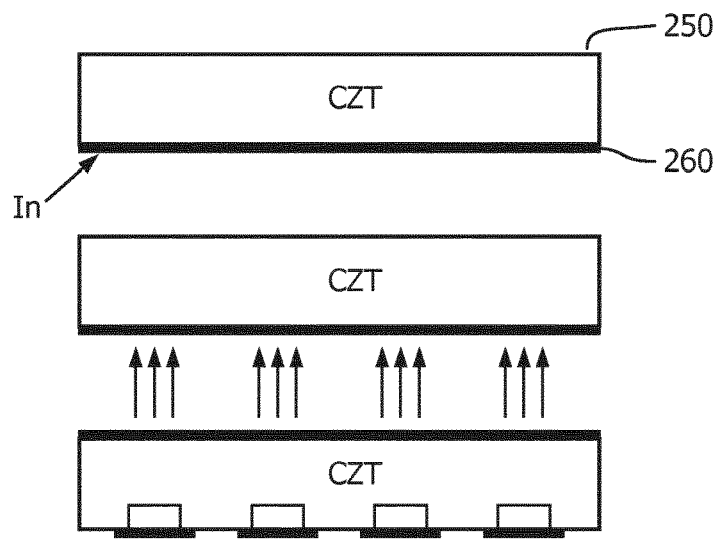
FIG. 5 is a simplified process flow which illustrates schematically a method according to the invention.

Eventually, in order to further control the drifting of the electron cloud 203, the anode side can be doped by a material of interest. In case of a CZT crystal, a typical doping material is Indium. The doping allows further strengthening the electric field lines near the anode structure, see FIG. 5. In a first step, the doping material is deposited at the anode-to-be side 260 of the crystal. Indium is known to easily diffuse into CZT for example. In a second step a laser beam is then used to locally heat the CZT area 260 which will later defined the anode structure. The local temperature and illumination time define the depth of the diffused area, effectively forming a doped region under the anode. Sequentially the remaining (not diffused) Indium is removed e.g. by etching. The side of the doped area can be different to what is shown in FIG. 5, either covering the whole anode area or just a portion of it.

Figure 6:
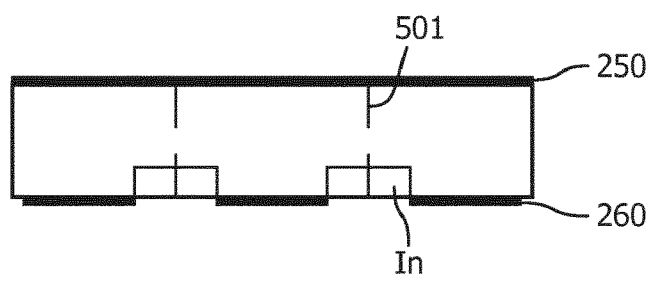
FIG. 6 is a schematic cross-sectional view of a detector resulting from a method according to the invention.

A further use of the previous embodiment is to dope the area between the pixels, as illustrated on FIG. 6, instead of the pixel area. This could prevent the formation of a space-charge region in the area between pixels exempt of electric field lines. Such space charge regions can influence the weighting potential and therefore the charge collection properties of the anodes. The introduction of an Indium doped region between pixels facilitates removing any trapped charges in that area.

While the invention has been illustrated and described in detail in the drawings and foregoing description, such illustration and description are to be considered illustrative or exemplary and not restrictive; the invention is not limited to the discussed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of pixel volume confinement in a crystal of an energy resolving radiation detector, an X-ray detector, a Computed Tomography detector, the crystal having a cathode side and an anode side, comprising:
   a Inducing a break line in the crystal along a pixel virtual limits
   b Passivating the break line
wherein the break line is induced by a focused ion beam;
   wherein the break line being passivated through oxidation of the crystal; and
   further comprising etching the break line surface before the oxidation of the crystal.

2. The method according to claim 1, wherein the oxidized part of the crystal has a thickness smaller than 10 nm.

3. The method according to claim 2, the oxidation of the crystal being performed wet-chemically.

4. The method according to claim 2, the oxidation of the crystal being performed by an oxide plasma.

5. The method according to claim 1, the break line having a width smaller than 1 μm.

6. The method according to claim 1, the break line having an end on the anode side of the crystal and/or on the cathode side of the crystal.

7. The method according to claim 1, further comprising locally doping the anode side of the crystal with a doping material.

8. The method according to claim 7, the doping being performed by:
   a. Deposing the doping material on a receiving area of the anode side of the crystal,
   b. Heating the receiving area, by at least one laser beam, in order to facilitate the doping material diffusion through the crystal, and
   c. Removing the non-diffused doping material, through etching.

9. The method according to claim 8, the receiving area being located between the pixels and/or in the pixel area.

10. The method according to claim 7, the doping material being Indium.

11. The method according to claim 7, the receiving area covering at least part of the anode side of the crystal, the whole anode side of the crystal.

* * * * *